Patented Apr. 2, 1940

2,196,075

UNITED STATES PATENT OFFICE 2,196,075

REFRACTORY AND METHOD OF MAKING IT

Ian M. Logan, Niagara Falls, Ontario, Canada, and John Charles McMullen, Niagara Falls, N. Y., assignors, by mesne assignments, to The Carborundum Company, Niagara Falls, N. Y., a corporation of Delaware No Drawing. Application July 9, 1936, Serial No. 89,846

3 Claims. (Cl. 49—79)

This invention relates to an improvement in refractory materials and the method of making them, particularly refractory articles which are cast in molds from molten refractory oxides. We have found the methods herein described to be particularly applicable with cast refractories containing a major proportion of alumina, although it is not necessary that the alumina be in such high percentage as to impart a corundum crystal structure to the cast body.

In the manufacture of cast refractory blocks for use in the lining of glass tanks and other furnaces, which blocks are made from high alumina mixtures as described, for example, in U. S. Patent No. 2,019,208, U. S. application Serial No. 702,942 and U. S. application Serial No. 721,064 which has become Patent 2,019,209, we have found that the internal structure of the block varies considerably from time to time but is in general characterized by the presence of bubbles or pores distributed rather generally throughout the casting. It should be pointed out here that in almost all such blocks there are zones which are composed of dense material. These zones are however interspersed with more porous ones, whereas the present invention is concerned with the structure of the casting as a whole except for the distinct shrinkage pipes which occur in the heart of the piece.

The porous structure is particularly apt to occur when the alumina is introduced in the form of bauxite or other non-prefused material. These cavities in the block are distinctly undesirable when the block is used for certain purposes, so that a great deal of work has been done to ascertain methods whereby they may be avoided. In blocks which are used in contact with molten glass or slag, for instance, the presence of pores permits the glass to penetrate more rapidly to the interior of the block and not only increases the area of the interface between the glass and refractory but tends to raise the temperature of the innermost face of the block, both of which effects result in an increased rate of erosion of the refractory by the glass or other slag. In still other applications, it is desired that heat be transmitted as readily as possible through the cast refractory block and the presence of pores decreases the thermal conductivity of the cast material quite markedly.

With cast materials made in accordance with our present invention these distributed pores are substantially completely eliminated with the result that the rate of corrosion of the refractory by slag in contact therewith is greatly reduced and the life of the casting prolonged. Without use of our improved technique the castings commonly show from 13 to 25% porosity, whereas we secure porosities as low as 5% or even 3% consistently. This is of great importance in increasing the life of the refractory in contact with corrosive melts. Moreover, we have found that the thermal conductivity of the casting is increased in approximately the same degree that the porosity of the block is diminished.

We have found that the controlling factor in determining whether the cast refractory is porous or solid is apparently the degree of reduction or oxidation of the alumina present. While we have not been able to evaluate this factor by analytical methods, we have found that when there is a deficiency of carbon in the melt the casting tends to be more or less porous and bubbly; whereas, when a very small proportion of reducing material, such as powdered coke, graphite or silicon carbide, is added to the melt the resultant castings are substantially free from scattered pores. Extreme caution must be used, however, to make sure that too much reducing material is not present, because it has been our experience that under the latter conditions the cast blocks contain carbides or other ingredients which are quite unstable so that when the casting is subsequently placed in a furnace wall and heated it cracks or may even fall to pieces forming a granular sandy mass. The degree of difference between the castings which give these different results is quite small and we have found the ordinary analytical methods of detecting the presence of carbide to be entirely unfeasible as a means of distinguishing between them.

While it is of course theoretically possible to so proportion the ingredients of one's melt as to secure the desired results directly, we have found that it is a much safer and easier procedure to feel one's way along by taking ladle samples of the melt from time to time and adding to the melt ingredients which produce different characteristic effects in such proportions as to give the desired final structure. Our method of procedure will perhaps be best explained by citation of an example wherein we make solid castings composed of approximately 95% alumina, 2% silica, 2% $TiO_2$ and traces of other constituents, particularly iron. As a raw material, scrap fused alumina abrasive fines may be utilized or one may start with bauxite. In the latter case the customary procedure used in the manufacture of fused alumina abrasives is followed and coke is added to reduce out any large proportion of iron or other undesired impurities. Metallic iron may also be added to scavenge the melt and assist in collecting the metallics in a pool at the bottom of the furnace, which metal is retained in the furnace while the refractory oxides are being cast.

When the fusion has been effected, a ladle sample is taken and rapidly chilled. It is then broken open and its internal structure observed. If it is substantially solid except for the presence of a shrinkage pipe, the material has been reduced either just right or perhaps too far. If the fracture is glossy, conchoidal and dark, the reduction has been carried too far. If, on the other hand, the ladle sample shows distributed bubbles throughout, it has been insufficiently reduced. The desired structure is a finely granular, non-porous one, which in the case of the particular material here used as an example has a slightly reddish tinge.

After observation of the ladle sample, we add an additional quantity of unfused bauxite, rutile, ferric oxide or other oxidizing material in case the sample has been solid and again take a sample after the melt has had time to become homogeneous. This material should be added in small amounts, equal to perhaps $\frac{1}{4}\%$ of the weight of the bath, the procedure being repeated if necessary.

If, on the other hand, the original ladle sample is bubbly we add a small percentage of coke of approximately 40 mesh size or finer and again sample. We proceed in this way until we arrive at a stage where the addition of a very small amount of coke produces a completely solid material in the ladle sample, and the addition of a small amount of oxidizing material thereafter causes the ladle sample to be bubbly.

As soon as the melt has thus been converted to a condition where the ladle sample is slightly on the bubbly side, we add to the fusion from $\frac{1}{10}$ to $\frac{1}{4}$ of 1% of its weight of a reducing material such as crushed coke and, after again checking it by means of a ladle sample to ascertain that it will produce a solid, finely granular structure, pour the melt into suitable molds in the customary manner. Alternatively to this last addition of coke, the fusion may be allowed to stand until reaction with the carbon of the electrodes has produced the desired result.

This procedure which has been recited by way of example in the instance of the high alumina mix above quoted, is similarly followed in the case of other aluminous materials containing 75% or more of alumina, more or less regardless of the other ingredients present. For instance, the method is applicable to the casting of mixtures in this composition range made up from alumina and chromite or alumina and magnesia, in which mixtures the alumina is 80% or more by weight. An important exception should be noted, however, in that the practice is not effective in high alumina compositions which also contain material percentages of alkali oxides as, for example, 5% of sodium oxide. The presence of the alkali apparently inhibits the formation of carbide and hence prevents the alumina arriving at the proper consistency to yield non-porous castings. Also the precautions appear unnecessary in the case of mullite and similar castings containing 15% or more of silica, which for some reason do not exhibit the bubbly structure even when highly oxidizing.

While we have indicated above that we believe the production of solid castings is dependent upon a delicate balance between aluminum oxide and aluminum carbide and have described typical experimental work which led us to this conclusion, it should be noted that this explanation is entirely hypothetical and that from a practical standpoint the invention is dependent upon the utilization of the methods indicated and the structures actually secured rather than upon the accuracy or inaccuracy of the carbide balance hypothesis.

We are unable to explain just why it should be that this balanced condition should be characterized by a freedom from bubbles. We have, however, noted that the addition of the final small percentage of carbon or other reducing material has a tendency to somewhat raise the temperature of the melt so that it may be that the resulting increase in fluidity permits the more ready escape of entrapped gas bubbles. It may also be that there is some composition or compound which is not understood by us, involving both aluminum oxide and aluminum carbide which is involved in the phenomenon. In any event, these explanations are offered merely as suggestions, and our invention is dependent upon the practical attainment of solid castings rather than upon any theory underlying their production.

Having thus indicated approximate range of substances to which our invention is applicable, as well as certain limitations thereof, and having described the application of our unique method to a representative mix, the invention which we desire to cover is as set forth in the following claims:

We claim:

1. In the process of producing substantially non-porous castings from a melt comprising at least 75% alumina and less than 5% of alkali oxide and which melt upon solidifying will provide a porous structure, the steps which comprise incorporating in said melt alternately small portions of carbon and a substance selected from the group consisting of bauxite, rutile and ferric oxide, and so proportioning said portions that a sample of the fusion taken in a test ladle and quenched will show substantially no pores, the total amount of carbon in the melt being no more than sufficient to substantially eliminate the pores, and casting the melt in the condition corresponding to the non-porous sample.

2. The process of producing substantially non-porous castings composed of over 75% alumina, which consists of producing a fusion of said composition containing less than 5% alkali oxide, a sample of which fusion shows substantial porosity when taken in a test ladle and quenched and thereafter adding carbon in small increments until a similar sample shows substantially no porosity, the total amount of carbon being no more than sufficient to substantially eliminate the pores, and thereupon casting the melt.

3. A substantially non-porous cast refractory article comprised of over 75% alumina and containing less than 5% of alkali oxide and further characterized by having a dense crystalline structure resulting from the addition to the melt from which said refractory article was cast of carbon in amounts no more than sufficient to substantially eliminate pores from the said refractory article.

IAN M. LOGAN.
JOHN CHARLES McMULLEN.